Nov. 14, 1967  D. R. SABRE  3,352,066
LENS MAKING APPARATUS
Filed April 2, 1965  3 Sheets-Sheet 1
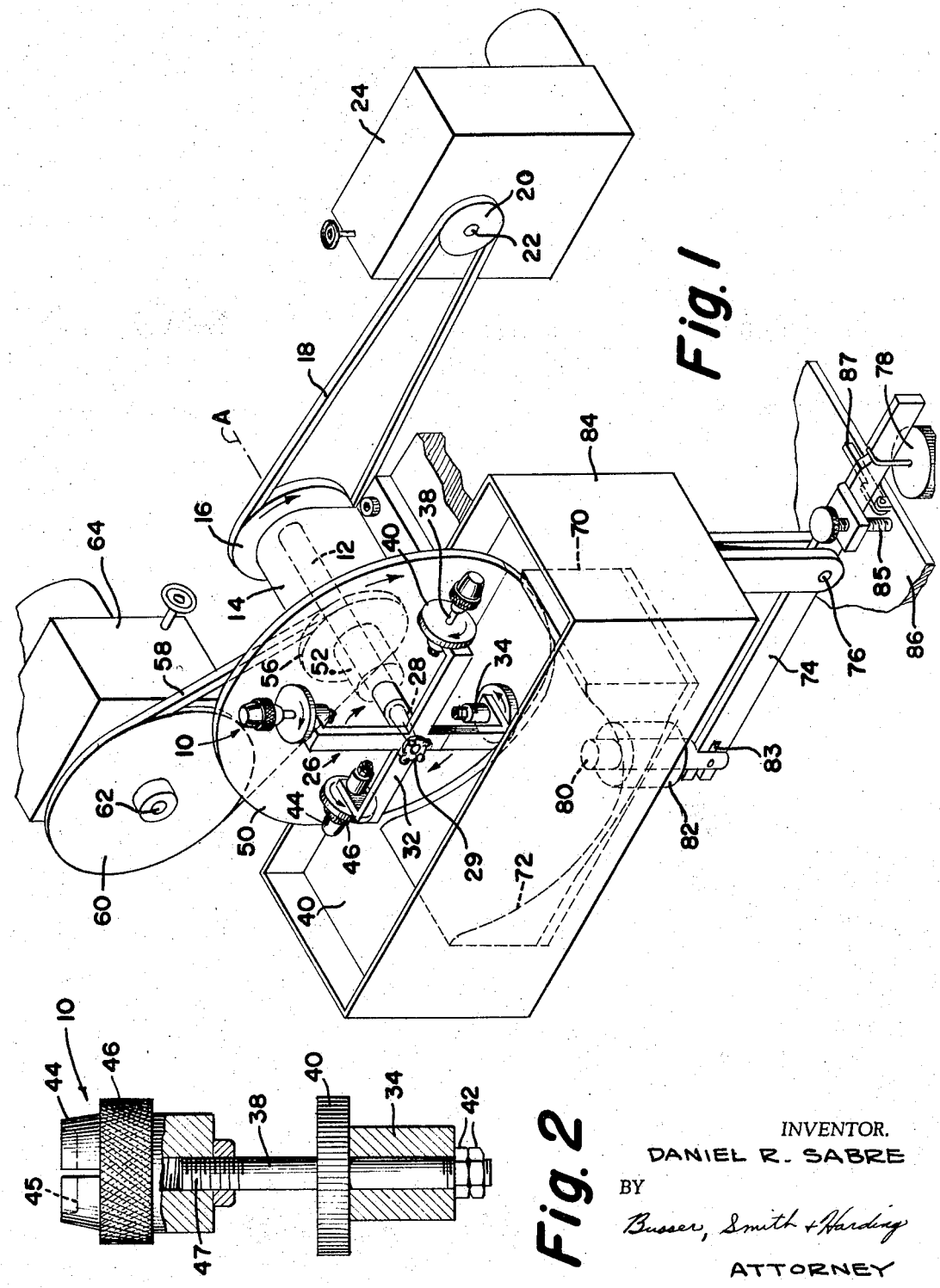
INVENTOR.
DANIEL R. SABRE
BY
Busser, Smith & Harding
ATTORNEY Nov. 14, 1967  D. R. SABRE  3,352,066
LENS MAKING APPARATUS
Filed April 2, 1965  3 Sheets-Sheet 2
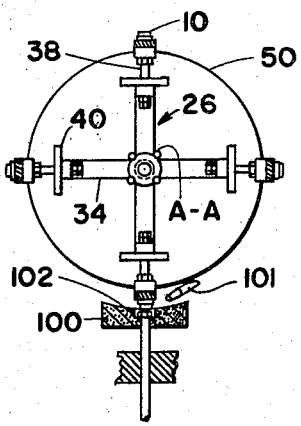
Fig. 3
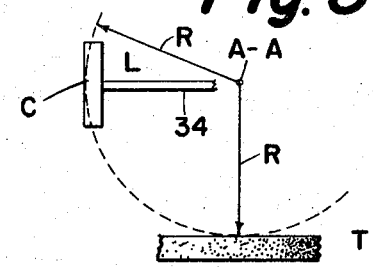
Fig. 8
Fig. 4
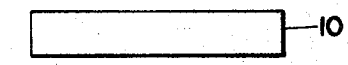
Fig. 5
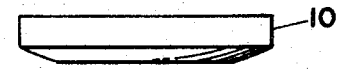
Fig. 6
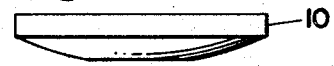
Fig. 7
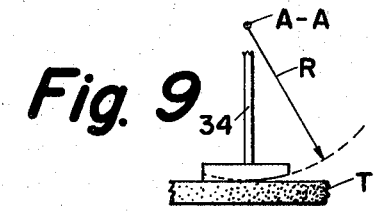
Fig. 9
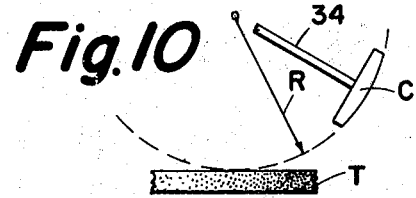
Fig. 10
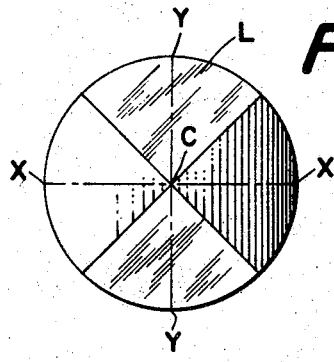
Fig. 11
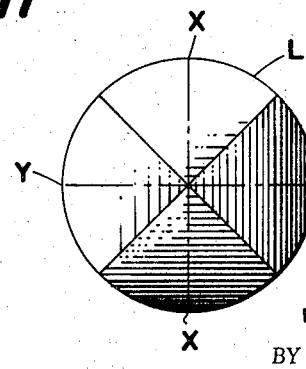
Fig. 12
INVENTOR.
DANIEL R. SABRE
BY
Busser, Smith & Harding
ATTORNEY Nov. 14, 1967 — D. R. SABRE — 3,352,066
LENS MAKING APPARATUS
Filed April 2, 1965 — 3 Sheets-Sheet 3
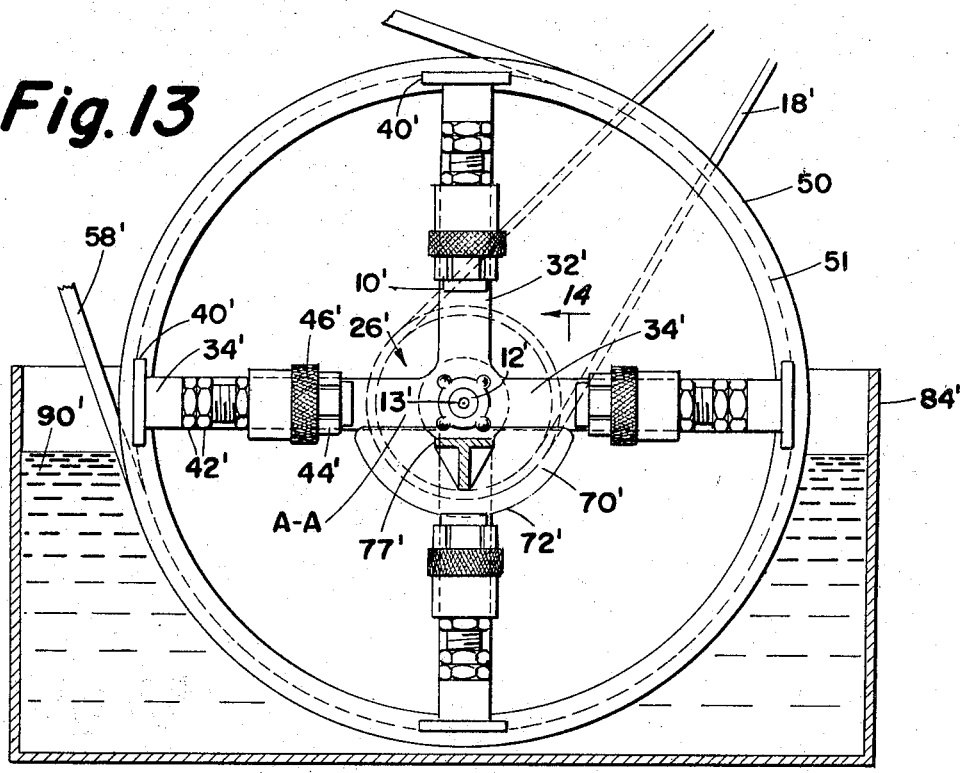
Fig. 13
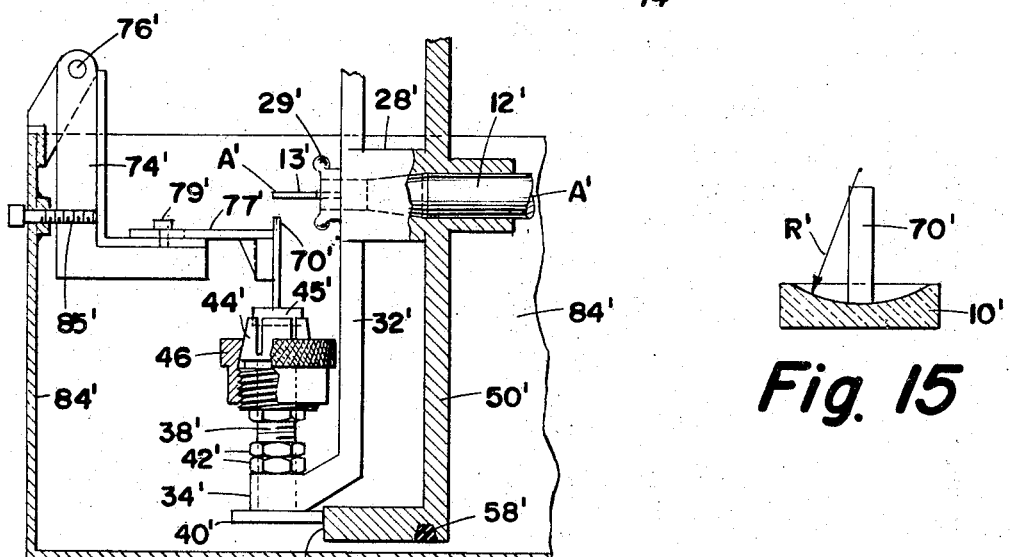
Fig. 14
Fig. 15
INVENTOR.
DANIEL R. SABRE
BY
Busser, Smith & Harding
ATTORNEY

United States Patent Office 3,352,066
Patented Nov. 14, 1967

3,352,066
LENS MAKING APPARATUS
Daniel R. Sabre, 560 Bryn Mawr Ave.,
Bryn Mawr, Pa. 19010
Filed Apr. 2, 1965, Ser. No. 445,098
18 Claims. (Cl. 51—162)

ABSTRACT OF THE DISCLOSURE

Apparatus for making lenses in which lens blanks are revolved about a first axis and rotated about an axis which is perpendicular to said first axis whereby the lens blanks are moved in a planetary-like path relative to a lens shaping member which contacts the surface of the lens blanks.

This invention relates to the art of lens making and particularly to methods and apparatus adaptable for use in the manufacture of precision lenses.

In accordance with the lens making methods in use today, a glass lens blank is made by either molding or grinding to approximate dimensions slightly larger than the final dimensions desired. This is followed by rough and finish grinding of the spherical surface of the lens almost to final dimensions. The final step in making the lens surface involves smoothing or polishing to the final dimensions of the lens.

The polishing step, as well as the grinding steps, are, in accordance with present practice, generally performed by mounting a block or group of lenses on a rotating spindle, the lenses being abraded by an oscillating tool while a solution of abrasive and liquid is fed between the tool and the lenses. The lens blanks are cemented to a block member which is mounted on a spindle by the use of pitch, the block member generally having circular recesses therein adapted to receive the lens blanks. An example of the conventional lens making arrangement is the apparatus shown in Patent No. 2,585,287.

The lens making methods and apparatus in use today require, for the making of precision lenses, highly skilled and experienced personnel. In the present methods, the steps of positioning the lens blanks on the block member, the addition of the abrasion solution, and the determination of when a lens has achieved the desired curvature and abrading operation should be stopped, are all steps which must be performed by someone having a high degree of skill and experience. Moreover, even with the highly skilled personnel using the conventional method, it is difficult to produce precision lenses. In fact, in most lens grinding operations, of the block of lenses which are produced, it will be found that they vary in their optical and physical dimensions so that only some of the block or group will come within the tolerances required for precision lenses.

Also, in accordance with the conventional methods of lens making, after the spherical surface is formed, the edge of the lens is ground with care being taken to insure that the edge is parallel to and concentric with the physical and optical centers of the lens. Moreover, the lenses produced on the blocking apparatus described above must, in the case of precision lenses, be tested and ground to insure that the physical and optical centers are in alignment, a procedure requiring expensive apparatus and highly skilled personnel. These edge grinding processes can produce distortion of the lens because of the heat and stresses produced during the edge forming procedure. In the conventional procedure, after the edging step, the edge of the lens is "blacked," which step must be performed so that the final diameter of the lens is almost exactly the same as the cylindrical lens holding device of the instrument wherein the lens is used. Also, the blacking should be performed without any of the blacking composition being deposited on the lens surfaces. This latter procedure is, of course, a very difficult task requiring expensive procedures.

It is the general object of this invention to provide a lens making apparatus which overcomes many of the above-discussed disadvantages of the present methods, which involves a simple apparatus for producing a precision lens with high reliability and which eliminates the need, in the prior methods, for the many steps subsequent to the lens surface forming step. The general object of the invention is provided by the provision of a novel apparatus for generating a spherical surface of a lens with positive accuracy and reliability.

Briefly stated, the procedure in accordance with the invention involves generating a spherical surface on a lens blank by providing a relative movement between the lens blank and a shaping member associated therewith such that the lens blank and the shaping member come into contact, at least, on a plurality of circular arcs on a spherical surface, such arcs intersecting at the center of the spherical surface and being located at circumferential positions circumscribing the spherical surface. More specifically, this is achieved by moving the lens blank in a planetary-like path relative to the shaping member.

In accordance with one embodiment of the invention, the lens blank is mounted for revolution about a first axis and for rotation about its own longitudinal axis as it is revolved about said first axis, the lens axis being perpendicular to the axis of revolution. There is provided a lens shaping means which provides a lap for contacting the surface of a lens to be formed as it is rotated and revolved about said axis. The lap provides a circular arcuate surface concentric with the axis of revolution and is arranged to engage the lens surface being formed. The radius of curvature of the lens is equal to the radius extending from the axis of revolution to the spherical surface of the lens, which radius is determined by the distance between the axis of revolution and the surface of the lap.

The above and other objects and features of the invention will become apparent from a consideration of the following description when read in conjunction with the accompanying drawings, in which:

FIGURE 1 is a perspective view of apparatus used in the making of convex lenses in accordance with the invention;

FIGURE 2 is a view of a detail of FIGURE 1;

FIGURE 3 is an elevation of another apparatus used in the making of convex lenses in accordance with the invention;

FIGURES 4 to 7 are views illustrating the progression of lens forming when using the apparatus shown in FIGURE 3;

FIGURES 8, 9 and 10 are diagrammatic views illustrating the manner in which a spherical surface is formed on a lens;

FIGURES 11 and 12 are end views of lens blanks formed in conjunction with the diagrammatic illustration of FIGURES 8, 9 and 10;

FIGURE 13 is an elevation of apparatus used in the making of concave lenses in accordance with the invention;

FIGURE 14 is a fragmentary section taken on line 14—14 of FIGURE 13; and

FIGURE 15 is a diagrammatic view of a concave lens formed in accordance with the apparatus shown in FIGURES 13 and 14.

In FIGURE 1 there is shown lens making apparatus for use in the step of smoothing and polishing convex lenses. The apparatus comprises means for revolving a plurality of lens blanks 10 about a horizontal axis of revolution indicated at A—A, such means including a horizontal shaft 12 mounted for rotation in a suitable bearing means 14. One end of the shaft 12 carries a drive pulley 16 which is driven by a belt 18 in engagement with a small pulley 20 keyed on the end of shaft 22 driven by a motor (not shown) through a variable speed transmission 24.

A spoke-like member 26 is mounted on the end of the shaft 12 for rotation therewith and comprises a hub 28 which is secured to the end of the shaft 12 by a tapered cam lock arrangement 29 or some other suitable quick mounting arrangement. The end of the shaft 12 is tapered to cooperate with the tapered bore in the hub 28 as is conventional with this type of mounting.

Projecting radially from the hub 28 are a plurality of arms 32 each of which has a turned end extending parallel to axis A—A and provided with a bearing 34. Journaled in the bearings 34 are a plurality of spindles 38 each of which has a small wheel 40 formed integrally therewith or suitably secured thereto. Each spindle 38 is mounted so that there will be no movement of the spindle 38 on the ends of the arms 32 along its axis, such as by a pair of jam nuts 42 threaded onto the end of the spindle 38, the wheel 40 and the nuts 42 being on the outer and inner sides, respectively, of the bearings 34, as shown in FIGURE 2. All the spindles 38 are arranged so that their axes extend radially from and perpendicular to the axis A—A of the shaft 12. A collet chuck is mounted on the outer end of each spindle 38. Each collet chuck comprises the usual externally coned and slotted sleeve 44 which is externally threaded for engaging an internally coned and threaded collar 46. The slotted outer end of the sleeve 44 defines a cylindrical recess 45 adapted to receive the cylindrical lens blank 10. In accordance with the usual operation of a collet chuck, rotation of the collar 46 in one direction causes the slotted end of the sleeve 46 to move inwardly to grip the periphery of the cylindrical lens blank 10 positioned therebetween. The collet chucks provide a very accurate and secure mounting for the lens blanks 10.

The collet chucks are mounted on a spindle for fine adjustment of the lens blanks 10 along their longitudinal axis. To this end, spindle 38 is provided with fine external threads which engage with a threaded bore 47 in the sleeve 46 whereby relative rotation between the sleeve and the spindle adjusts the axial position of the sleeve with respect to the spindle. Accordingly, the position of the bottom face of the cylindrical recess 45 which receives the lens blanks may be adjusted to various lens holding positions along the longitudinal axis of the lens blank, it being apparent that this bottom face determines the position of the lens blank with respect to the axis A—A. This fine adjustment permits accurate positioning of the lens blank holders so that all of them may be set to provide the same focal length on the lens. Also, the fine adjustment permits setting of the holders to vary the thickness of the lens blank to be formed as desired.

In accordance with the invention, it is essential that the lens blank mounting, comprising the arms 32, the spindles 38, and the collet chucks, be arranged so that the longitudinal axis of each cylindrical lens blank 10 is perpendicular to and extends radially to intersect the axis A—A about which the lens blanks are revolved. Moreover, the radial spacing between the axis A—A and the outer face of the lens blank should be the same for each of the lens blanks 10. This result can be achieved by the inherent construction of the mounting.

It will be apparent that the revolution of the lens blanks 10 around the axis A—A is achieved by rotation of the shaft 12 by means of the motor which drives the shaft 12 through transmission 24, shaft 22, pulley 20, drive belt 18, and drive pulley 16. The rotation of the shaft causes a corresponding movement of the arms 32 about the axis A—A much like the spokes of a wheel rotate about the wheel axis, the arms 32 causing the revolution of the lens blanks about the axis A—A.

Means are provided for rotating the lens blanks 10 about their longitudinal axes while they are being revolved about the axis A—A. Such means comprises a large disc 50 mounted on a sleeve 52 which is freely mounted on the shaft 12 for rotational movement independently thereof. The disc 50 is arranged with one of its faces in frictional contact with the peripheral edges of the wheels 40 so that relative movement between the disc 50 and the edges of the wheels 40 will cause rotation of the wheels 40. It will be apparent that the rotation of the wheels 40 may thus be effected merely by rotation of the arms 32 about axis A—A. However, means are provided to rotate the disc 50 so that the wheels 40 may be rotated at a relatively higher speed and so that this speed may be varied as desired. To this end, the sleeve 52 has a drive pulley 56 secured thereon, this pulley being driven by a belt 58 in engagement with a large pulley 60 keyed on the end of a shaft 62 driven by a motor (not shown) through a variable speed transmission 64.

By this arrangement, the rotation of the disc 50 through the above-described variable speed drive mechanism will cause rotation of the wheels 40 at a speed corresponding to the speed of disc 50. By means of the variable speed transmission 64, the speed of the wheels 40 may be varied to any desired amount. The rotation of the various parts are shown by the arrows in FIGURE 1. Although the disc 50 is shown rotating in the same direction as the arms 32, it is to be noted that these rotations may be in opposite directions.

The polishing of the lens blanks mounted on the spoke arrangement is effected by contact with a suitable shaping tool which, in the form of the invention shown in FIGURE 1, comprises a cast iron lap 70. The lap 70 defines a concave surface 72 having approximately a semicircular cross-section and defining a portion of a cylinder. The concave surface 72 faces the lens blanks 10 as they are revolved about axis A—A and is provided with a radius of curvature equal to the radius of curvature to be formed on the lens blanks 10. Since the lens blanks wear during the polishing step, the lap 70 is mounted for movement toward the axis A—A as such movement is accommodated by wearing of the lens blanks. It will be apparent that at the beginning of a polishing step the lens blanks are slightly oversize whereby the lap 70 may be spaced slightly further from the axis A—A than the final spacing necessary to achieve the completed lens curvature; however, the arrangement is such that as wearing of the lens blank occurs down to the final dimension, the lap may be moved to be exactly concentric with the axis A—A. Of course, the movement of the lap 70 during the polishing step is a very small amount.

The movable mounting for the lap 70 comprises an arm 74 mounted for movement about a pivot 76. One end of the arm 74 carries the lap 70 and is biased upwardly by a weight 78 mounted on the opposite end of the arm 74 from the lap 70. The weight 78 provides the desired lapping pressure which may be varied by changing the size of the weight. The mounting for the lap 70 comprises a vertically extending stud 80 which is secured to the bottom of the lap 70 and extends through a sealing fitting 82 in the bottom of a large tank 84 within which the lap 70 is contained for a purpose to be described hereafter. The stud 80 is pivotally and slidably mounted on a slot 83 in arm 74 and is guided by fitting 82 to move vertically as the arm 74 pivots. Accordingly, the lap 70 also moves vertically in response to the movement of arm 74. A stop is provided for limiting the movement of the lap toward the axis A—A and comprises a stop screw 85 mounted on the arm 74 and arranged to move into contact with a stop plate 86. The stop screw 85 may be adjusted to limit the upward movement of the lap 70 toward the axis A—A at any desired location. A pivoted arm 87 is provided for holding the arm 74 and lap 70 in an inoperative position, the arm 87 having a shoulder engageable with the arm 74.

The large tank 84 which contains the lap 70 therein is arranged so that the lens blanks 10 move into the tank 84 during the lower portion of their movement as they come into contact with the lap 70. The tank 84 is provided with a quantity of lapping solution 90 so that the lap 70 is submerged whereby the lapping solution 90 is supplied to the abrading region where the lap and lens blanks come into contact. Accordingly, the entire contact between the blanks and the lap will be on a wet surface.

The lapping solution may take various forms well-known in the art, such as for example, water having mixed therewith abrasive particles, such as diamond dust, aluminum oxide derivatives, and rouge. Also, the lap may be made of various abrasive stones well-known in the art. When a stone lap is used, it is not necessary to mix any abrasive particles with the water in the tank.

There is provided a gauge reference surface on the shaft 12 in the region between the collar 28 and the disc 50, this surface being very accurately formed to be concentric with the axis A—A. This reference surface is used in the setting up of the apparatus in conjunction with conventional gauges to position the collet chucks so that the recesses 45 are in the desired lens holding positions. The gauging may be accomplished by conventional "go and no-go" gauges as is conventional practice in the art. The reference surface is also used during the lens forming operation to gauge the radius of curvature of the spherical surface of the lenses in order to determine when the lens forming operation should be terminated.

In the lens polishing operation of the apparatus shown in FIGURE 1, the lens blanks 10 are given a planetary-like movement with the lens blanks 10 being revolved around the axis A—A while they are rotated about their longitudinal axis. This movement is effected by the drive mechanism described above. It will be apparent that by adjusting the variable speed transmissions 24 and 64, the lens blanks may be driven at the desired revolutional and rotational speeds. As is apparent from the relative sizes of the motor driven pulleys 20 and 60, the disc 50 is driven at a higher speed than the arms 32. During this movement, the lens blanks 10 move successively into the lapping solution and into contact with the lap 70 and are abraded so that they will be polished into the final dimension desired. The lapping pressure is provided by the weight 78 through the lever 74 and as the lens blanks 10 and the lap surface 72 wear, the lap 70 will move upwardly by reason of the pivotal mounting therefor. It will be apparent that the apparatus disclosed in FIGURE 1 is designed so that a convex spherical surface must be produced on the lens blanks.

In FIGURE 3 there is shown lens making apparatus for use in the initial rough grinding of a spherical surface on a cylindrical blank which would generally be preparatory to the final shaping steps such as finish grinding and polishing. The apparatus for holding, revolving and rotating the lens blanks is identical with that shown in FIGURE 1 and corresponding parts have been given the same reference numerals. However, instead of a lapping member 70, there is provided a grinding wheel 100. The grinding wheel 100 is of a conventional dressed wheel type having a spherical grinding surface 102 and is mounted to be moved radially toward the axis of revolution of the blanks 10 as grinding progresses. A wetting solution is directed onto the grinding surface by a suitable nozzle means 101.

In the use of the apparatus shown in FIGURE 3, the lens blanks 10 are initially cylindrical with flat faces as shown in FIGURE 4. FIGURES 5, 6 and 7 show the subsequent shapes formed on one face of the lens blank as the grinding wheel 100 is gradually moved toward the axis A—A.

In an actual production procedure, after the initial grinding has been completed by the use of apparatus such as that shown in FIGURE 3, the spoke member 26 may be removed and installed in an apparatus such as that shown in FIGURE 1 so that the lens blanks may be then polished to final dimensions. By this procedure, it will be apparent that there is no need to remove the lens blanks 10 from the holding means therefor, namely, the collet chucks.

The fact that the apparatus in accordance with the invention is designed so that a spherical surface will, as a matter of theory and practice, produce a spherical surface on a lens blank can be demonstrated by reference to FIGURES 8 to 12. It will be understood that these figures are merely for purposes of illustration and that a much different relationship of the parts will occur in an actual embodiment. In FIGURE 8, there is shown a cylindrical lens blank L which is to be abraded by a shaping tool indicated at T. The arrangement is such that the lens blank is to have a spherical surface with a radius of curvature R formed on the outer face thereof. Accordingly, the lens shaping tool T is opsitioned with the surface thereof spaced from the axis A—A an amount equal to the radius of curvature R. The shaping tool T is illustrated diagrammatically as comprising a flat surface extending tangentially of a circular path having a radius R. Thus, the minimum spacing of the tool T from axis A—A is along a line on the tool surface parallel to this axis. Theoretically, a shaping tool providing an abrading action along this line would be sufficient. However, for practical purposes a shaping tool having a substantial surface is preferable and a circular surface such as the lap 70 or the grinding wheel 100 is even more desirable in certain respects.

In order to form a spherical surface on the outer face of the lens blank L, there is provided an arm 34 which is arranged to hold the lens blank so that the center C of the outer face of the lens blank is spaced a distance R from the axis A—A, it being apparent that all the other points on the outer surface of the lens blank L are spaced from the axis A—A a distance greater than R. The arm 34 is also arranged to revolve the lens blank L in a circular path about the axis A—A with the longitudinal axis of the lens blank being perpendicular to and intersecting the axis A—A.

For purposes of illustration, let it be assumed that during a first revolution there is no rotation of the lens blank about its longitudinal axis. Thus, as the lens blank moves from the position shown in FIGURE 8 into contact with the shaping tool T to the position shown in FIGURE 9, a portion of the outer face thereof will be removed along a curved cylindrical-like surface having a radius R. As the lens blank moves to the position shown in FIGURE 10, a complete circular surface will be formed on the lens blank L on the outer face thereof. The condition of the lens blank at this position is shown in FIGURE 11, the lens blank having a cylindrical surface bisected by a circular arc XCX passing through the center point C. The remainder of the outer face of the lens blank L which did not come into contact with the shaping tool T during the first revolution remains flat.

Let it then be assumed that prior to the next revolution of the lens blank past the shaping tool, the lens blank will be rotated 90° about its longitudinal axis. Moreover, let it be assumed that during the next revolution there again is no rotation of the lens blank L about its longitudinal axis. The condition of the lens blank L after a second revolution is shown in FIGURE 12. The lens blank L now has a second cylindrical surface, which surface is bisected by the circular arc YCY passing through the center point C.

It will thus be apparent that if the above procedure of revolving the lens blank past the shaping tool were repeated for infinite number of positions of the lens blank circumferentially about the longitudinal axis thereof, a spherical surface will be formed having a radius of curvature R. This, of course, is the type of action that occurs with the apparatus in accordance with the invention wherein the lens blank is continuously rotated about its longitudinal axis as it is revolved about the axis A—A.

It will be apparent that by reason of the continuous rotation of the lens blanks about their longitudinal axis as they are moved past the shaping tool and because the lap 70 and the grinder 100 are actually extended curved surfaces, the actual abrading contact between the shaping tool and the surface of the lenses in an actual embodiment will be more complex than that described above. However, this actual contact is over a larger area during each revolution, and, of course, this improves the overall abrading efficiency of the apparatus.

The above discussion in conjunction with FIGURES 8 to 11 demonstrates that the configuration and arrangement of the shaping tool which comes into contact with the lens blanks during a lens making operation may take various forms in accordance with the invention. It is the path of movement given the lens blank which serves to generate the spherical surface thereon as it cooperates with a shaping tool, the tool surface wearing along with the lens blank to conform to a spherical shape having a radius extending from the axis of revolution A—A of the lens blanks to the surface thereof. Of course, the arrangement and construction of the shaping tool must be in accordance with good shop practice. The shaping tool may, as illustrated by FIGURES 8 to 10, be simply a flat abrasive member which may be moving or stationary. By way of example, the shaping tool may be a flat disc-like member presenting one of its faces toward the curved path of the lens blanks as shown in FIGURES 8 to 10, and the flat member may be rotated about an axis perpendicular to its flat surface which axis may or may not be aligned with the axis of revolution of the lens blanks.

In FIGURES 13 to 15 there is shown lens making apparatus for use in the step of smoothing and polishing concave lenses to produce a radius of curvature R' as shown in FIGURE 15. Since the apparatus shown in FIGURES 13 to 15 involves the same principles and generally the same apparatus as that shown in FIGURE 1, corresponding parts have been designated with corresponding reference numerals with primes added. The apparatus comprises means for revolving a plurality of lens blanks 10' about a horizontal axis of revolution indicated at A'—A', such means including a horizontal shaft 12' mounted for rotation in a suitable bearing means and driven by a variable speed drive such as that shown in FIGURE 1. A spoke-like member 26' is mounted on the end of shaft 12' for rotation therewith and comprises a hub 28' which is secured to the end of the shaft 12' by a tapered cam lock arrangement 29'.

Projecting radially from the hub 28' are a plurality of arms 32' each of which has a turned end forming a sleeve bearing 34', the axis of which extends radially with respect to axis A'—A'. Journalled in the bearings 34' on the ends of the arms 32' are a plurality of spindles 38' each of which carries a small wheel 40' suitably secured thereto. Each spindle 38' is mounted on an arm 32' in a fixed radial position by a pair of jam nuts 42' threaded on the spindle 38' and positioned to hold the inner face of the wheel against the bearing 34'. All of the spindles 38' are, of course, arranged so that their axes extend radially from and perpendicular to the axis A'—A'.

A collet chuck is mounted on the inner end of each spindle 38', each collet chuck comprising the usual externally coned and slotted sleeve 44' which is externally threaded for engaging an internally coned and threaded collar 46'. The slotted outer end of the sleeve 44' defines a cylindrical recess 45' adapted to receive the cylindrical lens blank 10. In accordance with the usual operation of a collet chuck, rotation of the collar 46' in one direction causes the slotted end of the sleeve 44' to move inwardly to grip the periphery of the cylindrical lens blank 10' positioned therebetween.

The collet chucks are mounted on the spindles 38' for fine adjustment of the lens blanks radially of axis A'—A'. To this end the sleeves 44' are threadedly engaged on the spindles 38'.

The lens blank mounting is arranged so that the longitudinal axis of each cylindrical lens blank 10' is perpendicular to and extends radially to intersect the axis A'—A' about which the lens blanks are revolved. Moreover, the radial spacing between the axis A'—A' and the space of the lens blank being formed should be the same for each of the lens blanks. This result can be achieved by the inherent construction of this mounting.

It will thus be apparent that rotation of the shaft 12' will cause a corresponding movement of the arm 32' about the axis A'—A' much like the spokes of a wheel whereby the lens blanks 10' are revolved about the axis A'—A'.

Means are provided for rotating the lens blanks 10' about their longitudinal axis while they are being revolved about the axis A'—A'. Such means comprises a large disc 50' which is freely mounted on the shaft 12' for rotational movement independently thereof. The disc 50' is provided with a rim 51' which is arranged to frictionally contact the peripheral edges of the wheels 40' so that relative movement between the disc 50' and the edges of the wheels 40' will cause rotation thereof. It will be apparent that rotation of the wheels may be effected merely by rotation of the arms 32'. However, as in FIGURE 1 means are provided to rotate the disc 50' so that the wheels 40' may be rotated at a relatively higher speed and so that this speed may be varied as desired. To this end, a drive belt 53' engages the periphery of the disc 50' and is engaged with a pulley driven by a motor to a variable speed transmission as in the case of the apparatus shown in FIGURE 1. The rotation of the various parts are shown by the arrows in the drawings.

The polishing of the lens blanks 10' is effected by contact with a suitable shaping tool which comprises a cast iron lap 70'. The lap 70' defines a convex surface 72' which is approximately semi-circular as viewed in FIGURE 13 and has a spherical configuration. The convex surface 72' faces the lens blanks 10' as they are revolved about the axis A'—A' and is provided with a radius of curvature equal to the radius of curvature to be formed on the lens blanks 10'. Since the lens blanks 10' wear during the polishing step, the lap 70' is mounted for movement away from the axis A'—A' as such movement is accommodated by wearing of the lens blanks. As in the case of the apparatus shown in FIGURE 1, the surface 72' is constructed to be concentric with the axis A'—A'.

The movable mounting for the lap 70' comprises an arm 74' mounted for movement about a pivot 76'. A horizontally extending portion of the arm 74' carries a horizontally extending member 77' which carries at its end the lap 70'. The member 77' is adjusted for horizontal movement on the arm 74' by means of a lock screw arrangement 79'. It will be noted that the arm 74' and the pivot 76' are mounted on a tank 84' within which the lap 70' is contained. A stop is provided for limiting the movement of the lap 70' away from the axis A'—A' and comprises a stop screw 85' mounted on the tank 84' and arranged to be contacted by the arm 74' as it pivots to move the lap 70' away from the axis A'—A'. The stop screw 85' may be adjusted to limit the downward movement of the lap 70' away from axis A'—A' at any desired location. It will be apparent that the lapping pressure is determined by the weight of arms 74' and 77' and the lap 70'. This pressure may be varied by mounting additional weights on the arm 74'.

The tank 84' which contains the lap 70' therein is arranged so that the lens blanks 10' move into the tank during the lower portion of their movement as they come into contact with the lap 70'. The tank is filled with a quantity of lapping solution 90' so that the lap 70' is submerged whereby the lapping solution is supplied to the abrading region where the lap and the lens blanks come into contact.

Extending from the end of the shaft 12' is a cylindrical member 13' which provides on its periphery a gauge reference surface which is formed, with a high degree of accuracy, to be concentric with the axis A'—A'. It will be noted that the reference surface of the member 13' is arranged to be within the plane of revolution of the lenses whereby a simple measuring stick type of gauge may be used to gauge the radius of curvature formed on the lens blanks as well as the spacing between the bottom of the lens receiving recess 45' and the axis A'—A'.

It will be apparent that the lens polishing operation of the apparatus shown in FIGURES 13 to 15 is essentially the same as that described with respect to FIGURE 1. The only essential difference is that a concave lens is being formed and the attitude of the various parts is changed. It will also be apparent that the movement of the lens blanks with respect to the lap 70' is such that a spherical surface must be formed on the lens blanks 10' and the same principles described above obtain.

By using the apparatus in accordance with this invention in the making of a lens, it will be apparent that a much simpler and more reliable procedure may be used. This is due to the fact that the apparatus in accordance with this invention can form a precision lens surface which does not require any substantial steps subsequent to the forming of the surface in order to complete the lens. In fact, the spherical surface forming step may be the last step in the lens manufacture. Thus, the blacking and the edge grinding steps may be performed prior to the final polishing of the spherical surface of the lens. By using applicant's apparatus, the lens which has been blacked and which has been ground to the final outer diameter, may be placed in the collet chucks of the apparatus and will be positioned accurately so that a spherical surface will be formed precisely concentric with the spherical surface and the circular periphery of the lens. Accordingly, no subsequent steps are required to bring the spherical and physical centers of the lens into alignment and no edge grinding of the lens is required. Moreover, since the blacking is performed prior to the polishing, any blacking material which may have been deposited on the face of the lens will be removed by the polishing step. It will thus be apparent that the disadvantages of the prior lens grinding method as discussed above have been overcome by the use of applicant's apparatus. Moreover, applicant's apparatus is so simple to use that there is no requirement for highly skilled and experienced personnel. Furthermore, the apparatus in accordance with the invention is easily adaptable for forming lenses of various curvatures. This may be achieved merely by providing for adjustment of the collet chucks along the longitudinal axis of the lens and with respect to the spoke-like arms or merely by using different spoke-like arrangements constructed to provide the desired radius of curvature.

Another feature of the invention is that the lenses produced by the apparatus will all have the same radius of curvature with a high degree of accuracy. This is obvious from a consideration of the structure involved. This feature of the invention is particularly useful for the making of ledges in stereo viewing since the apparatus so used requires the use of identical lenses.

Another advantage of the apparatus in accordance with the invention is that it can be adapted for a production line type of setup in which a known and orderly progression from rough grinding to final polishing may be achieved. In accordance with this advantage, there may be provided a plurality of apparatus arranged to operate on the lens blanks sequentially to remove a desired amount of the spherical surface in sequential steps. In operation, the spoke-like members may be moved from apparatus to apparatus in the desired sequence, it being noted that there is no need to change the position of the lenses.

Another advantage of the present invention over prior methods relates to the advantages which flow from the fact that in accordance with the invention there is a line-type of contact between the lens and the shaping tool. For example, by a consideration of FIGURE 1, it will be apparent that as each lens blank moves past the lap 70, at any instant the lens surface can only contact the lap along a circular line. This is because of the generally cylindrical shape of the lap. In prior lens making procedures, the shaping tool has a spherical surface which is presented to the entire surface of the lens blank with the object being that the lens surface will be formed into the same spherical shape of the shaping tool. In other words, the object of prior procedures is to achieve precise conformity between the spherical surface of the lap and the spherical surface of the lens. Accordingly, in these prior methods, there is contact over a spherical area between the lens and the lap. Thus, in an actual lens making operation in order to avoid ditsortion due to both heat and improper abrasive contact, it is necessary to keep a fluid film of the lapping solution between the lap and the lens at all times, to keep the fluid film uniform throughout the mating surfaces, and, at the same time, keep the heat down and the abrasive qualities high. This is extremely difficult with a spherical contact region.

However, with the present invention, by using a cylindrical lap as in FIGURE 1, or a similarly shaped lap for other applications, the contact between the lens and the lap is made on a line. Thus, since the lap is submerged in a fluid, maintaining a fluid film between the lap and the lens is much more certain, the lapping solution having free access when both sides of the line contact bearing region. Accordingly, heat is dissipated and there is less likelihood of any harmful abrasive contact directly between the lap and the lens surface without a film therebetween. Accordingly, with applicant's arrangement, the dangers of distortion have been avoided. Moreover, since the contact is along a line, it is much easier to regulate the lapping pressure or the unit load applied between the lap and the lens. Moreover, once the load to provide the desired lapping pressure is determined for a particular operation and a particular lapping solution, it is a simple matter to reduplicate this load since the fluid film will not vary as greatly as with a spherical type of contact.

Another feature of the present invention is that any type of glass may be used to make the lenses. The apparatus is not limited to use with high-grade types of glasses.

It is to be understood that the invention is not to be limited to the details of construction and arrangement of parts illustrated in the accompanying drawings, since the invention is capable of other embodiments and of being practiced or carried out in other ways. Accordingly, it is not desired to be limited except as required by the following claims.

What is claimed is:

1. Apparatus for generating a surface on a lens blank comprising a lens holder adapted to hold a lens blank, means rotating said lens holder to cause movement of the lens blank about an axis of rotation, means moving said lens holder to cause the lens blank to move in a circular path about an axis intersected by said axis of rotation of the lens blank and to which said axis of rotation of the lens blank is perpendicular, and lens shaping means arranged to contact the lens blank along a lens shaping surface as it is moved in said circular path and rotated.

2. Apparatus for generating a convex surface on a lens blank comprising a lens holder adapted to hold a lens blank, means rotating said lens holder to cause movement of the lens blank about an axis of rotation, means moving said lens holder to cause the lens blank to revolve about an axis intersected by said axis of rotation of the lens blank and to which said axis of rotation of the lens blank is perpendicular, said lens blank being positioned with the surface to be formed thereon facing away from said axis of revolution, and lens shaping means arranged to contact the lens blank along a lens shaping surface as it is revolved and rotated.

3. Apparatus according to claim 2 wherein said lens shaping means comprises a lap member having a cylindrical surface facing said lens blank and mounted to be concentric with said axis of revolution.

4. Apparatus according to claim 2 wherein said lens shaping means comprises a grinding wheel having the grinding surface thereof facing said lens blank.

5. Apparatus for generating a concave spherical surface on a lens blank comprising a lens holder adapted to hold a cylindrical lens blank, means rotating said lens holder to cause movement of the lens blank about an axis of rotation thereof, means moving said lens holder to cause the lens blank to revolve about an axis intersected by said axis of rotation of the lens blank and to which said axis of rotation of the lens blank is perpendicular, said lens blank being positioned with the surface to be formed thereon facing toward said axis of revolution, and a lens shaping member arranged to contact the lens blank along a spherical surface as it is revolved and rotated and comprising a lamp member defining a spherical surface mounted to be concentric with said axis of revolution.

6. Apparatus for generating a surface on a plurality of lens blanks comprising a plurality of lens holders each adapted to hold a cylindrical lens blank, means rotating said lens holders to cause movement of lens blanks held thereby about an axis of rotation thereof, means moving said lens holders to cause each of the lens blanks to revolve about an axis intersected by said axis of rotation of each of the lens blanks and to which said axis of rotation of each of the lens blanks is perpendicular, and lens shaping means arranged to contact said lens blanks along a lens shaping surface as they are revolved and rotated.

7. Apparatus for generating a convex surface on a plurality of lens blanks comprising a plurality of lens holders each adapted to hold a cylindrical lens blank, means rotating said lens holders to cause movement of lens blanks held thereby about an axis of rotation thereof, means moving said lens holders to cause each of the lens blanks to revolve about an axis intersected by said axis of rotation of each of the lens blanks and to which said axis of rotation of each of the lens blanks is perpendicular, each of said lens blanks being positioned with the surface to be formed thereon facing toward said axis of revolution, and lens shaping means arranged to contact said lens blanks along a spherical surface as they are revolved and rotated.

8. Apparatus according to claim 7 wherein said lens shaping means comprises a lap member having a cylindrical surface facing said lens blanks and mounted to be concentric with said axis of revolution.

9. Apparatus according to claim 7 wherein said lens shaping means comprises a grinding wheel having the grinding surface thereof facing said lens blanks.

10. Apparatus for generating a concave spherical surface on a plurality of lens blanks comprising a plurality of lens holders each adapted to hold a cylindrical lens blank, means rotating said lens holders to cause movement of lens blanks held thereby about an axis of rotation thereof, means moving said lens holders to cause each of the lens blanks to revolve about an axis intersected by said axis of rotation of each of the lens blanks and to which said axis of rotation of each of the lens blanks is perpendicular, each of said lens blanks being positioned with the surface to be formed thereon facing toward said axis of revolution, and a shaping member arranged to contact said lens blanks along a spherical surface as they are revolved and rotated and comprising a lap member defining a spherical surface mounted to be concentric with said axis of revolution.

11. Apparatus for generating a surface on a plurality of lens blanks comprising a member mounted for rotation about a first axis, a plurality of lens holders mounted on said member and spaced from said first axis for revolution thereabout as said member rotates, each of said lens holders being adapted to hold a cylindrical lens blank with an axis of rotation thereof intersecting and perpendicular to said first axis as said holders are revolved thereabout, said mounting for each of said holders comprising a spindle mounted for rotation to cause rotation of the lens blanks about said axis of rotation thereof, means drivingly engaging said spindles to cause rotation thereof and of said lens blanks as said lens blanks revolve about said first axis, and lens shaping means arranged to contact said lens blanks along a spherical surface as they are revolved and rotated.

12. Apparatus according to claim 11 wherein each of said spindles carries a wheel, said drive means for rotating said spindles comprising a disc rotating about said first axis and engaging the periphery of said wheels to cause rotation thereof and of said spindles.

13. Apparatus according to claim 11 including a tank containing a quantity of abrading solution, said lens shaping means being positioned within said tank with at least a portion submerged in said abrading solution whereby abrading contact between said shaping means and said lens blanks occurs within said solution.

14. Apparatus according to claim 11 wherein each of said holders comprises a collet chuck means including a tubular member having a cylindrical recess therein and movable to grip a cylindrical lens blank within said cylindrical recess.

15. Apparatus according to claim 11 including means mounting each of said holders for adjustment radially along the said axis of rotation of the lens blank held thereby.

16. Apparatus according to claim 11 including a means defining a gauge reference surface mounted to project from said rotating member in axial alignment with said first axis to provide a gauging surface for use in the measurement of the spacing between said first axis and the spherical surface of the lens blanks.

17. Apparatus according to claim 11 wherein said lens shaping means comprises a lap member defining a lapping surface facing the spherical surface of the lens blanks, said lapping surface having a substantial circumferential extent along the path of revolution of said lens blanks, means mounting said lapping member for movement toward said lens blanks as said lens blanks wear, and means biasing said lapping member toward said last-mentioned movement thereof.

18. Apparatus according to claim 17 including means for limiting said movement of said lapping member towards said lens blanks at a desired location.

References Cited

UNITED STATES PATENTS

| | | | |
|---|---|---|---|
| 291,130 | 1/1884 | Bausch | 51—162 |
| 1,230,530 | 6/1917 | Stead | 51—133 |
| 1,832,190 | 11/1931 | Doane | 51—134 XR |
| 2,585,287 | 2/1952 | Turner et al. | 51—216 |
| 2,703,470 | 3/1955 | Porter et al. | 51—60 |

LESTER M. SWINGLE, *Primary Examiner.*